2,760,748

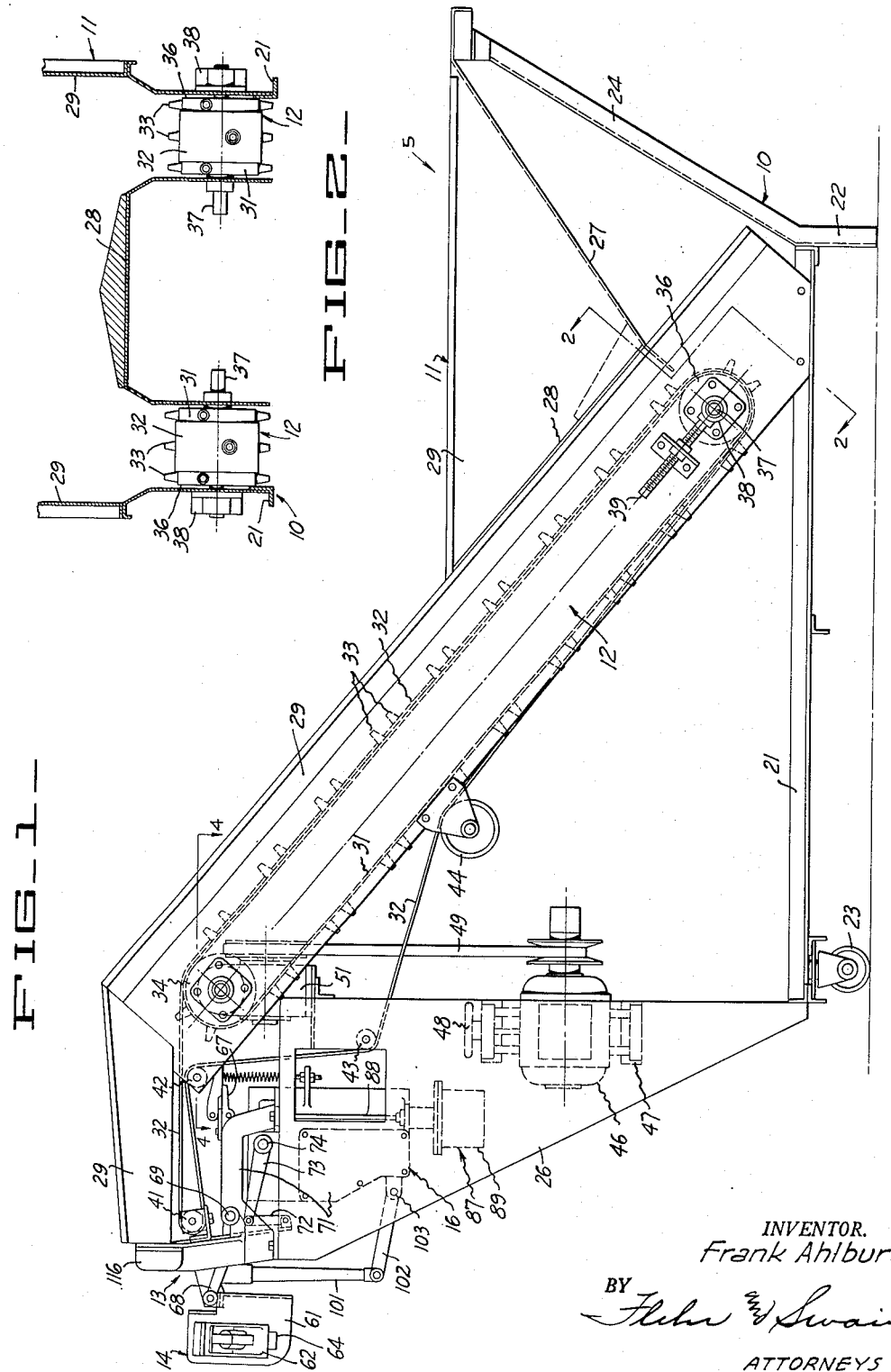

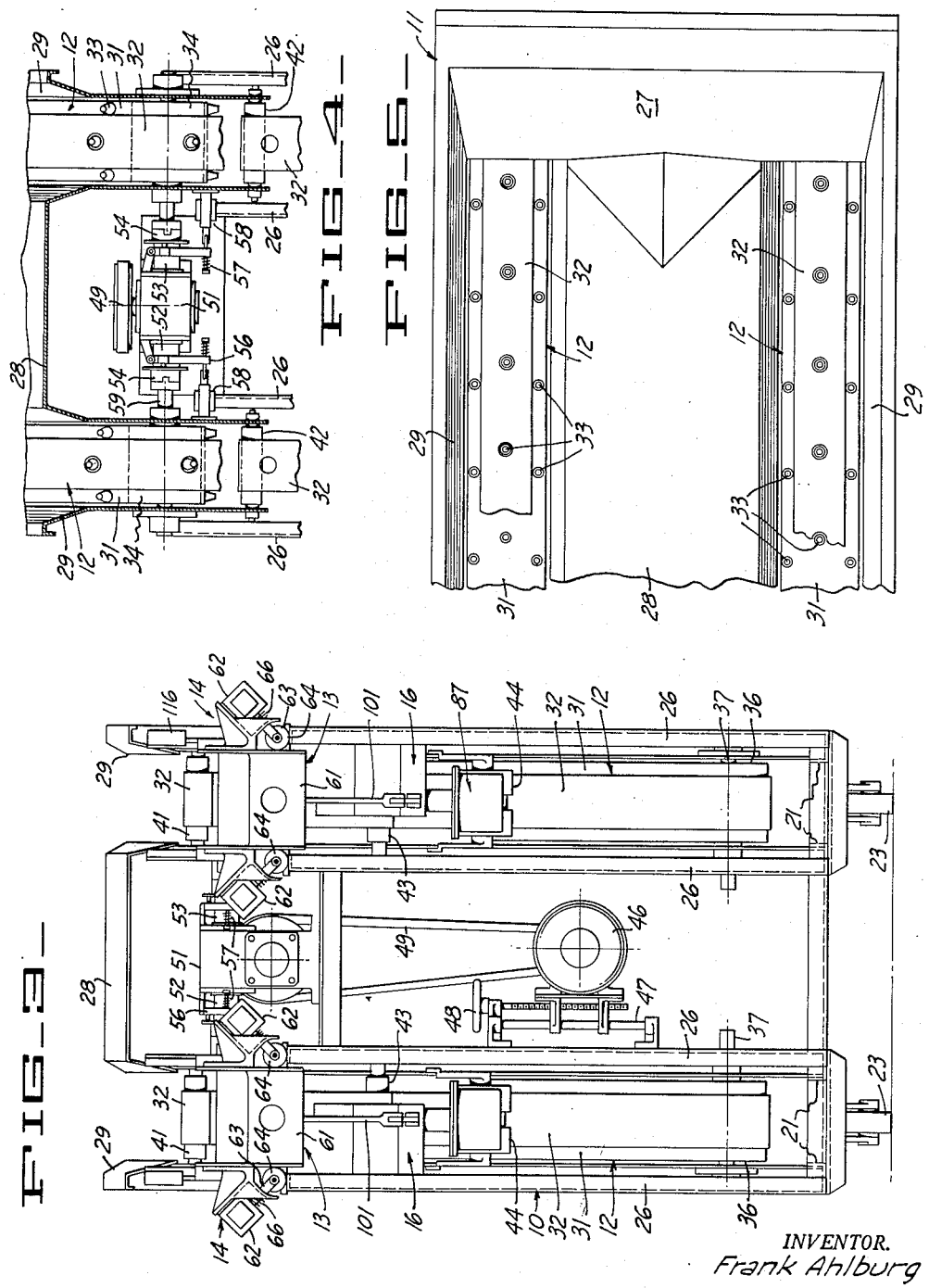

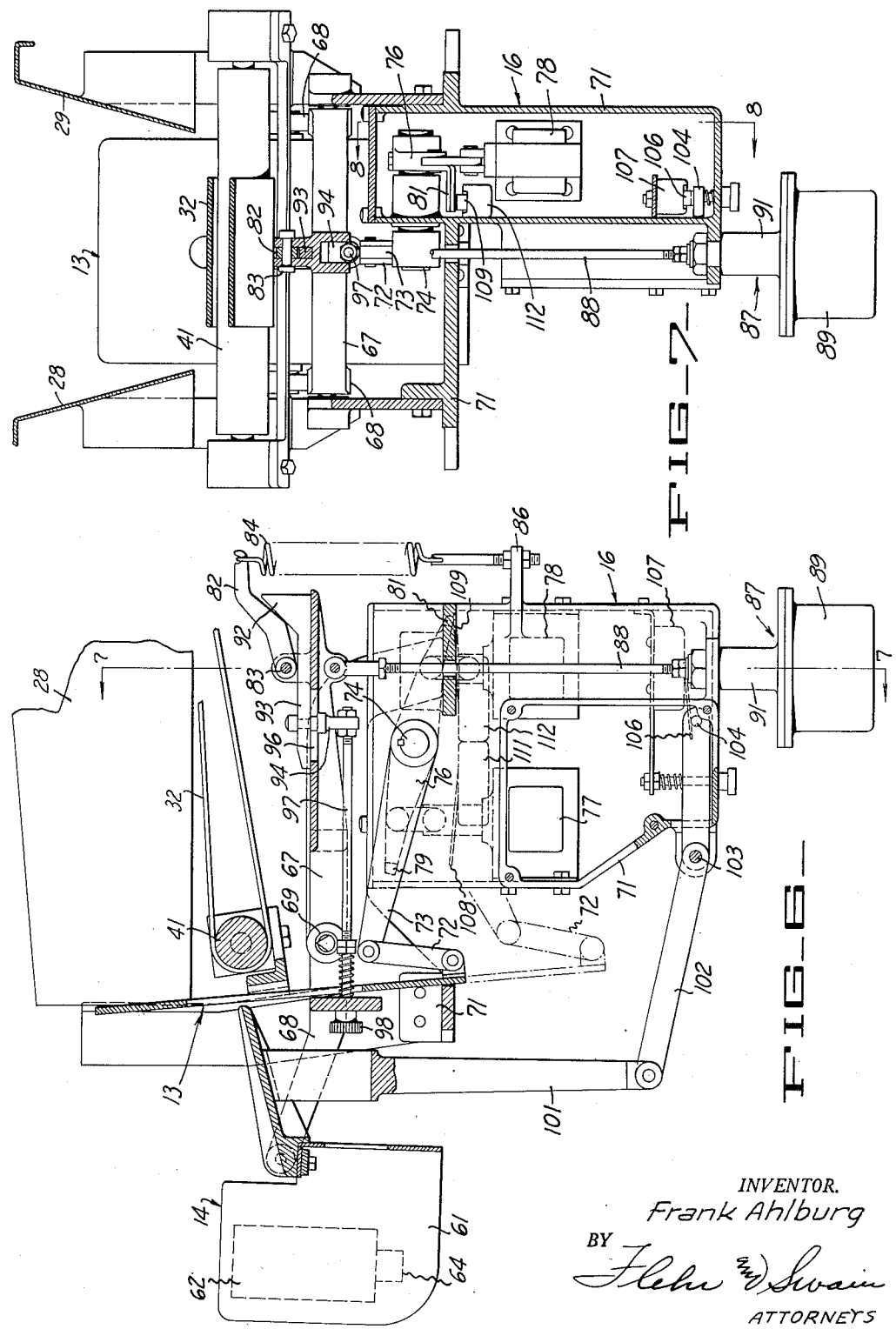

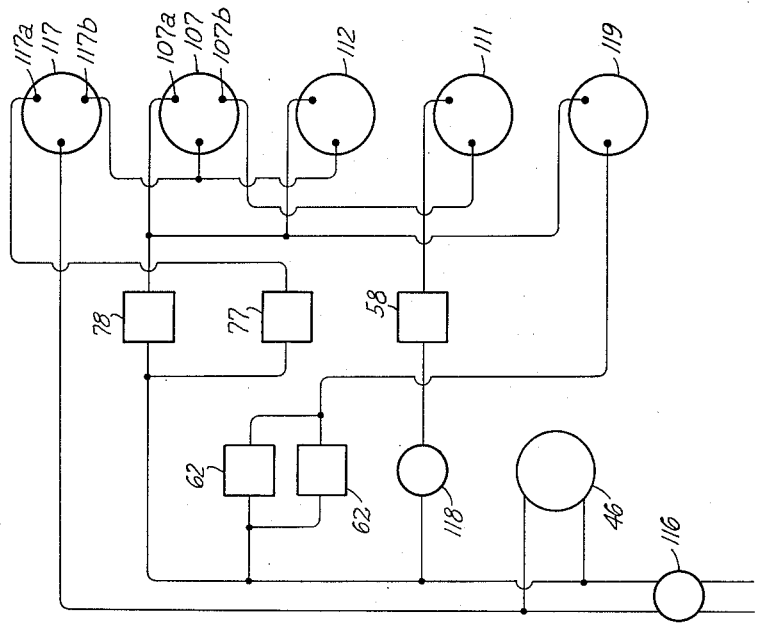
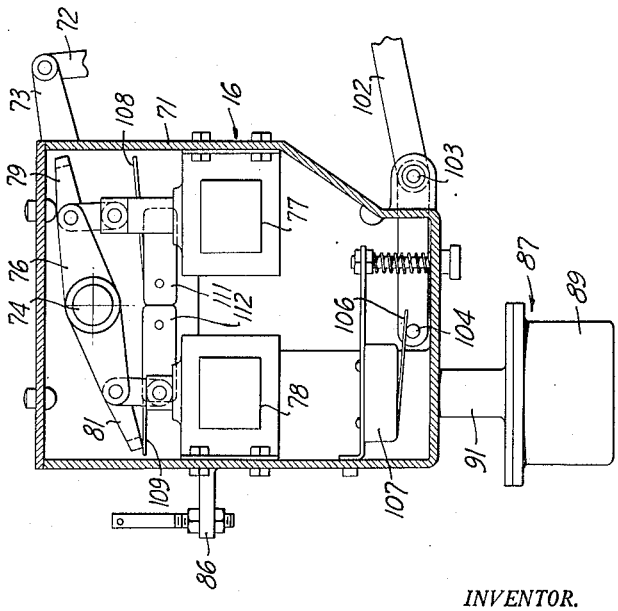

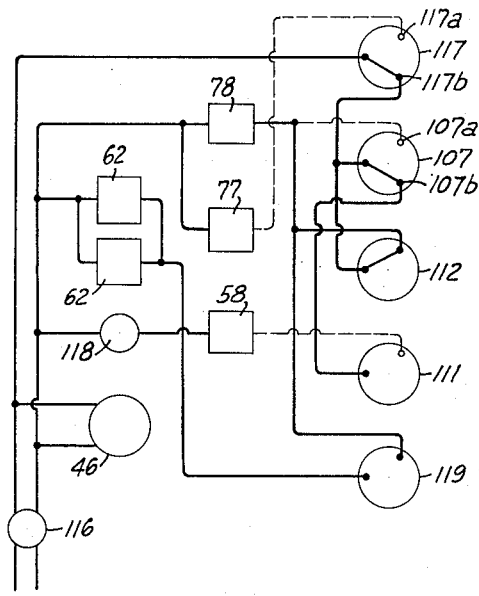
FIG_9A_
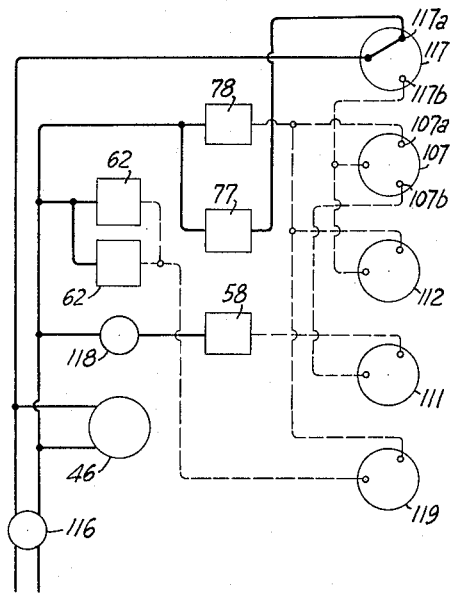
FIG_9B_
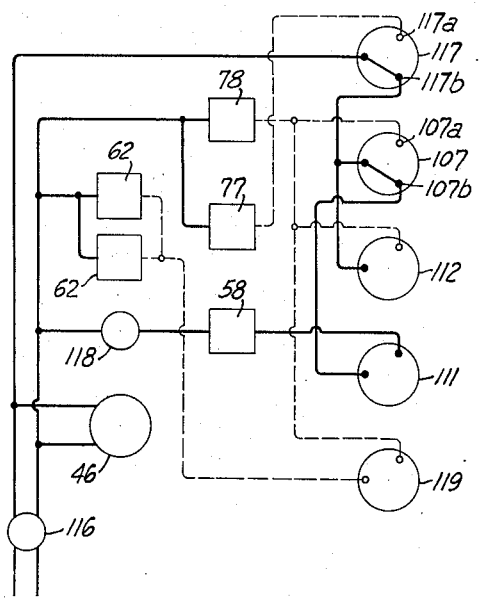
FIG_9C_
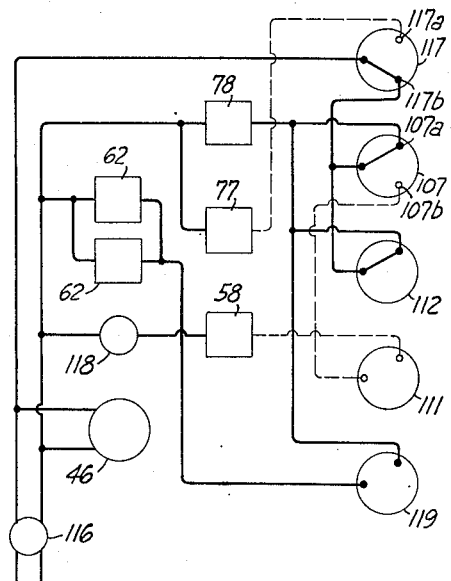
FIG_9D_
INVENTOR.
Frank Ahlburg United States Patent Office 2,760,748
Patented Aug. 28, 1956

SINGLE GATE BAGGING AND WEIGHING MACHINE

Frank Ahlburg, Los Angeles, Calif.

Application January 28, 1952, Serial No. 268,573

8 Claims. (Cl. 249—61)

This invention relates to bagging machines and particularly to that type of bagging machine adapted to be used in the packaging of fruit and vegetables.

More particularly this invention relates to a device which supports a bag in such a manner that when fruit or vegetables within the bag reach a predetermined weight, the introduction of more fruit or vegetables into the bag is halted. The means for preventing more fruit or vegetables from entering the bag is in this case a single solenoid actuated gate adjacent the mouth of the bag.

It is an object of this invention to provide a device of this kind which is particularly useful in the bagging of small lots of fruit or vegetables such as is done in the ultimate retail outlet as distinguished from the conventional packing sheds where entire crops are graded and packaged. To accomplish this result I have provided a portable device which may be used in substantially any location and which does not require expensive or extensive set up for prior handling of fruit. It will be seen from the specification that the device is one which can be operated by unskilled labor.

It is a further object of this invention to provide a single gate bagger which is highly accurate in its operation, simple in its construction and easily repaired.

Other objects and advantages of this invention will appear from the following specifications taken in conjunction with the accompanying drawings in which:

Figure 1 is a side elevational view of a bag filling machine incorporating my invention.

Figure 2 is a fragmentary view taken along the line 2—2 of Figure 1 illustrating the bottom of the fruit hopper and showing particularly the belt assembly as the same exists at the bottom of the hopper.

Figure 3 is a front elevational view of my bag filling machine.

Figure 4 is a horizontal fragmentary cross-section taken along the line 4—4 of Figure 1 showing the drive and clutch control assembly for the conveyor belts, the lower ends of which were illustrated in Figure 2.

Figure 5 is a fragmentary top plan view of the fruit hopper illustrated in Figure 1 as viewed generally along the line 5 of Figure 1.

Figure 6 is an enlarged vertical cross-sectional detail of the gate and gate control mechanism.

Figure 7 is an enlarged vertical cross-sectional detail taken along lines 7—7 of Figure 6.

Figure 8 is an enlarged vertical cross-sectional detail taken along line 8—8 of Figure 7.

Figures 9, 9a, 9b, 9c and 9d are wiring diagrams illustrating the electric control system for my device.

Generally speaking my invention consists of a frame assembly 10 which is adapted to support the various other portions of the device in proper relationship with respect to each other.

A fruit hopper 11 is adapted to receive fruit and vegetables in loose form. It will be noted that the fruit hopper is provided with sloping side walls so that the fruit therein will tend to seek the bottom of the hopper where it will be engaged by a conveyor assembly 12 and carried in more or less single file arrangement through a gate 13 and into a package such as a bag which is held by a bag holding means 14.

The gate 13 is operated and controlled by a gate control assembly 16 which in turn is responsive to the weight of the fruit within the bag which is supported by the bag holding means 14. Suitable drives and electric controls comprise the remainder of the machine.

Specifically the frame assembly 10 consists of a pair of side rails 21 which are supported from the floor by legs 22 at one end and movable casters 23 at the other. Upwardly sloping side rails 24 support one end of the fruit hopper 11. Forwardly extending side plates 26 support the forward end of my device including the gate 13 and the bag holding means 14, the gate control assembly 16 and the drive for the entire device. Various other structural elements, too numerous to mention, comprise the remainder of the frame 10 and will hereinafter be referred to loosely as a part or portion of the frame 10. It is to be understood that suitable enclosing members may be utilized or not for the purpose of appearance.

The fruit hopper assembly 11 consists of a rear sloping wall 27 and a divided sloping center panel 28 which acts as a portion of the floor of the hopper 11. Side walls 29 complete the hopper assembly.

Positioned between the floor 28 and the side walls 29, however, I have provided a conveyor assembly 12 which consists of a pair of belts 31 and 32. The belt 31 is provided with a number of studs or fingers 33 which are preferably formed integrally therewith although they may be secured thereto in any suitable manner. At any rate, the fingers 33 are preferably flexible and deformable and adapted to push fruit up the trough formed by the belts and side walls 28 and 29.

The belt 31 is reeved about a driving drum 34 which it frictionally engages and about an idler drum 36 which is mounted upon a transverse axle 37. The transverse axle 37 is mounted in bearings 38 which are movable longitudinally with respect to the frame 10 by means of screw assemblies 39. By rotating the screw assemblies 39 the bearings 38 and the axle 37 may be moved longitudinally with respect to the frame 10 thereby increasing or decreasing the tension upon the belt 31.

The second or upper belt 32 is provided with a number of orifices which are adapted to register with the fingers 33 so that the fingers 33 will extend through the orifices and be free to engage the fruit in the hopper 11 and carry the same upwardly between the side walls 29 and the other portions of the frame 10. However, it will be noted that the belt 32 in addition to being reeved above the idler drum 36, and the driving drum 34, is also reeved about rollers 41, 42, 43 and 44 in such a manner that it is carried to a position immediately adjacent the gate 13 in such a manner that the fruit that has been raised from the fruit hopper 11 by the fingers 33 on the belt 31 will be carried to a position adjacent to or through the gate 13. However, at times the gate 13 is elevated and it is not desirable that the fruit be urged against the raised gate 13 by the fingers 33 because it might be bruised. Therefore, since the fruit has been elevated to the desired height, further transportation of the fruit can be simply had by frictional engagement of the same by the upper run of the relatively smooth belt 32.

The means for driving the drum 34 and the belts 31 and 32 consist of an electric motor 46 which is suitably mounted upon a vertical rail assembly 47 and whose position upon the rail is controlled by a lead screw assembly 48. The motor 46, through the belt 49, drives, through a suitable power divider assembly 51, the two shafts 52 and 53. The shafts 52 and 53 drive identical assemblies and therefore only one will be described. Shaft 52 is provided with a clutch 54 which is engaged or disengaged by the operation of a yoke 56. The clutch 54 is normally held in disengaged position by the spring 57 and is returned to engaged position by the actuation of the solenoid 58 against the spring 57. Therefore when the solenoid 58 is deenergized, the spring 57 disengages the clutch 54. However, when the solenoid 58 is energized the effect of the spring 57 upon the yoke 56 is overcome and the clutch 54 is engaged with the result that the driving drum 34 is driven.

Operation of the fruit hopper and conveyor assembly may be briefly described as follows: The fruit or vegetables to be handled or packaged are placed in the hopper 11. The fruit will tend to fall to the bottom of the hopper 11 because, as has previously been pointed out, the end walls 27 and side walls 29 together with the center partition and floor assembly 28 are all sloping. The side walls 29 and the center floor and partition assembly 28 serve to create a pair of vertically inclined parallel troughs, the floors of which are formed by the conveyor assemblies 12. As the fruit adopts a position in the bottom of one of the troughs thus formed, it will be engaged by one or more of the fingers 33 which are mounted upon the belt 31 and extend through the belt 32. As the conveyor assembly advances the fruit will be carried upwardly along the bottom of one of the inclined troughs until it reaches the level of the driving drum 34. At this point the fingers 33 are retracted through the orifices in the belt 32 and no longer engage the fruit. However, the fruit will be carried along the upper run of the belt 32 to a point adjacent the idler roller 41 or the gate 13. The foregoing all presupposes, however, that current has been supplied to the motor 46 and that the solenoids 58 are energized in which event the power from the motor 46 will be transmitted through the gear assembly 51 and clutches 54 to the driving drums 34. However, in the event the solenoids 58 or either one of them is deenergized, the respective clutch 54 will be disengaged with the result that the driving drum 34 will not be driven and the belts or conveyor assembly 12 which it actuates will remain stationary in which event no fruit will be advanced by that conveyor assembly until the solenoids 58 may again be energized.

The gate 13, the bag holding means 14 and the gate control assembly 16 are best illustrated in Figures 6, 7 and 8, although some reference will be made to Figures 1 and 3. As has previously been pointed out fruit or other articles are advanced or carried by the belt 32 to a position immediately overlying the roller 41 and between the side walls 28 and 29. The passage of fruit over the end of the belt 32 is controlled by the gate 13. The gate is mounted for vertical movement in suitable guides between two limiting positions, one being a lower or retracted position in which the upper edge of the gate 13 does not interfere with the passage of the fruit and the second being a raised position in which the upper edge of the gate 13 serves to block the passage of articles.

When the gate 13 is in lower position and the fruit or vegetables are adapted to pass over the upper edge of the same, they will pass into suitable bags which are held by the bag holding means. The bag holding means consists of a collar arrangement 61 which is adapted to be inserted into the upper open end of a bag which is held against the collar 61 by means of a suitable solenoid clamping assembly illustrated particularly in Figure 3. This clamping assembly consists of a pair of solenoids 62 whose plungers 63 are provided with resilient members 64. Normally the plungers 63 are urged by means of the springs 66 to the position illustrated in Figure 3 in which position the members 64 tightly engage the outer side walls of the collar in such a manner that if there were a bag, for example, positioned about the collar 61 the same would be retained by the clamping action of the spring urged members 64. However, in the event the solenoid 62 is energized, the members 64 are retracted against the springs 66 and the bag is free to be removed from the collar.

The collar 61 is mounted upon a weighing beam 67 and is pivotally supported between a pair of laterally spaced forwardly extending weighing beam arms 68. The arms 68 have fulcrum connections 69 with the frame 71 of this gate control assembly whereby the beam 67 extends generally horizontally and may rock about a horizontal axis defined by the fulcrum connections 69.

When a bag or other container is suspended from the collar 61 in the manner previously described, fruit or vegetables may be dropped into the bag and the entire weighing arm will oscillate about the axis of the pivotal fulcrum connections 69 without material displacement of the bag with respect to its vertical axis.

Electrical operating means are provided for the gate 13. Thus the gate 13 is pivotally attached to a link 72 which in turn is pivotally connected to one end of a lever 73. Lever 73 is fulcrumed at 74 in the frame 71 and is in turn connected by the arm 76 with the operating members of a pair of electrical solenoids 77 and 78. The arm 76 is also provided with a pair of switch operating fingers 79 and 81 whose purpose will be more fully hereinafter described.

In order to properly counterbalance the weighing beam, arm 82 is pivoted at 83 to the rear arm of the weighing beam and this arm is attached to a tension spring 84, the other end of which is anchored at 86 to the frame 71.

Suitable dash pot means is provided to prevent rapid movement of the weighing beam 67. The arrangement illustrated consists of a rod 88 having its upper end pivoted to the arm of the weighing beam and its other end extending downwardly into the dash pot chamber 89. This chamber accommodates the plunger which is attached to the lower end of the rod 88 and operates in a suitable damping fluid such as oil which is maintained within the chamber. The dash pot chamber is attached by an extension 91 to the frame 71 of the gate control assembly.

Means are provided to enable an adjustment of a counterbalancing spring from the front of the machine. Thus the arm 82 is engaged by a triangular cam plate 92 which in turn is mounted upon the rear end of a bar 93. The bar 93 is slidably mounted upon the beam arm and has a depending lug 94 extending through a slot 96. The lug 94 is attached to a rod 97 the forward end of which is threaded and engaged by an adjusting nut 98. The nut 98 is seated in the frame 71 and can be engaged by a screw driver or other instrument to adjust it. It will be evident that by turning the nut 98, the rod 97 is adjusted longitudinally to correspondingly adjust the triangular cam 92. Thus the angular setting of the arm 82 with respect to the weighing beam is adjusted to effectively change the tension of the counterbalancing spring 84.

To the lower side of the portion of the collar 61 there is pivotally secured a downwardly extending rod 101 to which there is pivotally connected, in turn, a rod 102 fulcrumed at 103 with respect to the frame 71. The arm 102 is provided with a switch operating finger 104 which is adapted to engage the operating lever 106 of a switch 107. It will be apparent that the oscillation of the collar 61 about the fulcrum connections 69 will be transmitted through the arms 101 and 102 to actuate the switch 107.

The switch operating fingers 79 and 81 are adapted to engage the operating arms 108 and 109 of the switches 111 and 112 respectively.

It will be apparent from the foregoing that when the solenoid 78 is energized and the solenoid 77 is deenergized the gate will be elevated. It is also apparent that when the solenoid 78 is deenergized and the solenoid 77 is energized that the gate 13 will be lowered to retracted position.

A suitable electric circuit serves to operate the device. The circuit is illustrated in Figures 9, 9a, 9b, 9c and 9d and will now be explained in detail. Electrical energy is supplied from the suitable source of outside current and its supply to my machine is controlled by a manually operated toggle switch 116 which controls the flow of current to the entire device including the flow of current to the motor 46.

Switch 117 is a manually operated single pole double throw switch from which current is adapted to be directed either through terminals 117a or 117b. This switch is manually operated and controls the flow of current to all parts of the machine other than the motor 46.

Switch 107 is also a single pole double throw switch which directs current through its contacts 107a or 107b. Switch 107 is responsive to the position of the bag holding means 14. This switch through its contact 107a controls the supply of current to one side of the solenoid 78 which it will be recalled is the solenoid which raises the gate 13 and to one side of switch 119. Through its contact 107b this switch supplies current to one side of switch 111.

The switch 112 is a single pole single throw switch and responds to actuation of the arms 76 when the gate 13 is at the upper or closed position. Switch 112 is in parallel with switch 107 and serves to insure a supply of current to the solenoid 78 after the gate has closed regardless of whether the switch 107 is in contact with either of its contacts 107a or 107b, and regardless of the position of the bag holding means 14.

Switch 111 is a single pole, single throw switch which responds to the position of the gate arm 78 when the gate is at its low or open position. The switch 111 controls the supply of current to the belt clutch solenoid 58.

The switch 118 is a manually operated switch in series with the belt clutch control solenoid 58 whose purpose is to permit emergency stopping of the belt without necessitating closing of the gate.

Switch 119 is a foot operated single pole, single throw switch which supplies energy to one side of the bag holding solenoids 62.

As has previously been pointed out in the specification solenoid 78 controls the raising of the gate and solenoid 77 controls the lowering of the gate. The solenoids 62 operate the bag holding means.

Operation of the device may be described as follows: The fruit to be bagged is placed in the hopper 11 and will fall by gravity to the lower floor of the hopper where it will be engaged by the fingers 33 and be brought upwardly out of the hopper when the machine is actuated.

Let it be assumed that a cycle of operation has been completed that is, that a bag has been filled, the gate 13 is raised, and the belt has been stopped. A new bag is positioned on the collar and is held in place by the members 64. The bag holding assembly will have been released to raised position by the removal of the filled bag.

When the switch 116 is closed energy will be supplied to the motor 46, to one side of the solenoid 58, to one side of the solenoids 62, to one side of each of the solenoids 77 and 78 and to the switch 117. The switch 117 is normally in the position illustrated in Figure 9a whereby current flows therefrom through contact 117b to the closed switch 112 which in turn energizes the gate raising solenoid 78. However, since the gate is already raised there will be no change. However, one side of the switch 119 will also be energized with the result that when the switch 119 is closed energy is supplied to both of the solenoids 62 to retract them for positioning of a bag or other fruit retaining means.

Reference should now be made to Figure 9b. When the switch 117 is closed, even though instantaneously, energy is supplied through the contact 117a to the solenoid 77 which lowers the gate 13 and, in addition, serves to close the switch 111. The switch 112 is opened. Solenoid 78 is deenergized. Switch 112 is operated by the finger 81. However, this situation is only instantaneous inasmuch as the switch 117 is spring loaded so that when manual pressure is released therefrom the same returns to the position which is illustrated in Figure 9c.

Reference should now be made to Figure 9c. The gate 13 will remain in lowered position. However, current will flow from contact 117b and will energize one side of the switch 107, which it will be recalled is now closed across the contact 107b whereby energy will be supplied to the closed switch 111 (closed by the position of the gate) with the result that the clutch solenoid 58 will be energized and the belts will be caused to operate.

When the machine is in the operating position illustrated generally in Figure 9c and the gate 13 is lowered, the belts carry the fruit upwardly through the fruit hopper and the bag fills. Since no energy is being supplied to one side of the solenoid 62 the bag is being retained on the collar as previously described.

Reference should now be had to Figure 9d. When the bag fills, the bag holding assembly will drop against the spring 84 with the result that the switch 107 will be closed across its contact 107a. This energizes the solenoid 78 with the result that the gate 13 is immediately raised. Raising of the gate will open the switch 111 and will close the switch 112. Opening of switch 111 will deenergize the clutch control solenoid 58 with result that the belts will stop. The bag is then full, the belts have stopped, and the gate 13 is in elevated position. By closing the switch 119 the operator may energize the solenoids 62 with the result that the bag may be released and may be removed from the machine. By maintaining his foot upon the switch 119 the operator may keep the solenoid 62 retracted and an empty bag or container may be put on the collar for throat 61. However, when the circuit switch 119 is opened the solenoids 62 are deenergized with the result that they will then reposition themselves under the influence of the spring 66 and retain the bag upon the collar. The removal of the filled bag from the bag retaining means will result in a raising of the bag holding assembly and a closing of the switch 107 across its terminal 107b.

The operator may then actuate the switch 117 in such a manner that it is closed across its terminal 117a with the result that the solenoids 77 will again be actuated which will result in the gate being lowered which, as has previously been pointed out, effects the closing of the switch 111 and an opening of the switch 112 as illustrated in Figure 9b.

I claim:

1. In a filling and weighing machine for handling articles such as citrus fruits, apples, potatoes and the like, a pivoted weighing beam, means for supporting an article receiving means from one end portion of said beam, storage means for retaining a quantity of said articles, means for conveying said articles along a predetermined path from said storage means to said article receiving means, gate means mounted in said path and movable from an article passing position to an article blocking position, means controlled by the movement of said beam for actuating said gate to move the same to an article blocking position when said article receiving means has received a predetermined weight of said articles, means actuated by said gate means when it is in an article blocking position to stop the motion of said conveyor means, and means also actuated by said gate when it is in an article blocking position to retain said gate means in its article blocking position regardless of the subsequent movement of said beam, manually operated means for moving said gate means to an article passing position, and means actuated by said gate means when moving to an article passing position to start the motion of said conveyor means.

2. A device as in claim 1 wherein said means for supporting an article receiving means comprises support means mounted on said beam and adapted to be inserted within the upper end of said article receiving means, frictional members mounted on said support means and adapted to engage the outer upper end of said article receiving means, solenoid operated means for causing said frictional members to frictionally hold the article receiving means against said support means, and means for energizing said solenoid operated means.

3. A device as in claim 1 wherein said means for supporting an article receiving means comprises support means mounted on said beam and adapted to be inserted within the upper end of said article receiving means, solenoid operated means mounted on said support means and adapted to engage said article receiving means to frictionally hold the same against said support means, and means for energizing said solenoid operated means.

4. In a filling and weighing machine for handling articles such as citrus fruits, apples, potatoes and the like, a pivoted weighing beam, means for supporting an article receiving means from one end portion of said beam, storage means for retaining a quantity of said articles, and means for conveying said articles along a predetermined path from said storage means to said article receiving means, gate means mounted in said path and movable from an article passing position to an article blocking position, and means responsive to said weighing beam for controlling said gate means and said conveyor means, said means for supporting said article receiving means comprising support means mounted on said weighing beam and adapted to be inserted within the upper end of said article receiving means, solenoid operated means mounted on said support means and adapted to engage said article receiving means to frictionally hold the same against the support means, and means for energizing said solenoid operated means.

5. In a filling and weighing machine for handling articles such as citrus fruits, apples, potatoes and the like, a pivoted weighing beam, means for supporting an article receiving means from one end portion of said beam, storage means for retaining a quantity of said articles, means for conveying said articles along a predetermined path from said storage means to said article receiving means, and means associated with said weighing beam for automatically controlling the operation of said conveyor to stop the same when said article receiving means has received a predetermined weight of said articles, said means for supporting said article receiving means comprising support means mounted on said beam and adapted to be inserted within the upper end of said article receiving means, solenoid operated means mounted on said support means and adapted to engage said article receiving means to frictionally hold the same against the support means, and means for energizing said solenoid operated means.

6. In a device for supporting article receiving means and adapted for use with a dispensing machine of the type wherein the articles are dropped into the article receiving means, said device comprising a vertically movable collar-like member mounted on said dispensing machine and adapted to be inserted into the open end of said article receiving means, a pair of solenoids mounted on opposite sides of said collar-like member, a plunger mounted in each of said solenoids and movable between two positions, a resilient member mounted on one end of each of said plungers and adapted to engage said collar-like member, and means mounted on each of said plungers for continuously urging said plungers towards one position, said solenoids when energized serving to move said plungers towards the other position, said plungers in one position firmly engaging said collar-like member and being adapted to frictionally retain the open end of said article receiving means on the collar-like member to provide the sole support for the article receiving means while the article receiving means is being filled.

7. In a device for supporting bags and adapted for use with a dispensing machine of the type wherein the articles are dropped into the bags, said device comprising a vertically movable collar-like member mounted on said dispensing machine and adapted to be inserted within the open ends of the bags, a pair of solenoids mounted on opposite sides of said collar-like member, a plunger mounted in each of said solenoids and movable between bag engaging and bag releasing positions, a resilient roller rotatably mounted on one end of each of said plungers and means mounted on each of said plungers for continuously urging each of said plungers towards one of said positions, said solenoids when energized serving to move said plungers towards the other of said positions, said resilient rollers in the bag engaging position serving to frictionally engage the upper end of a bag inserted on the collar-like member, said resilient rollers and said collar-like member serving to provide the sole support for the bag while the bag is being filled.

8. In a device for supporting bags and adapted for use with a dispensing machine of the type wherein the articles are dropped into the bags, said device comprising a vertically movable collar-like member mounted on said dispensing machine and adapted to be inserted in the open end of the bags, said collar-like member being comprised of substantially vertical portions adapted to engage the inner surfaces of the bags, a pair of solenoids mounted on opposite sides of said collar-like member, a plunger mounted in each of said solenoids and movable between bag engaging and bag releasing positions, said plungers extending at an angle with respect to said collar-like member, a horizontal resilient roller rotatably mounted on one end of each of said plungers and means mounted on each of said plungers for continuously urging each of said plungers toward a bag engaging position, said solenoids when energized serving to move said plungers toward a bag releasing position, said resilient rollers in the bag engaging position serving to frictionally engage the upper end of a bag inserted on the collar-like member, said resilient rollers and said collar-like member providing the sole support for the bag while the bag is being filled.

References Cited in the file of this patent

UNITED STATES PATENTS

| Number | Name | Date |
|---|---|---|
| 410,886 | Gill | Sept. 10, 1889 |
| 1,209,105 | Bates | Dec. 19, 1916 |
| 1,372,480 | Buschman | Mar. 22, 1921 |
| 1,376,249 | Buehler | Apr. 26, 1921 |
| 1,851,017 | Middelboe | Mar. 29, 1932 |
| 2,338,148 | Walker | Jan. 4, 1944 |
| 2,376,810 | Richardson | May 22, 1945 |
| 2,464,545 | Ahlburg | Mar. 15, 1949 |
| 2,496,019 | Peel | Jan. 31, 1950 |
| 2,511,241 | Bowes | June 13, 1950 |
| 2,536,516 | Peterson | Jan. 2, 1951 |
| 2,574,486 | Kobey | Nov. 13, 1951 |
| 2,592,074 | Slusher | Apr. 8, 1952 |
| 2,634,082 | Knobel | Apr. 7, 1953 |